(12) United States Patent
Zhu et al.

(10) Patent No.: US 10,983,724 B2
(45) Date of Patent: Apr. 20, 2021

(54) CONTROLLER WITH DISTRIBUTED SEQUENCER COMPONENTS

(71) Applicant: Micron Technology, Inc., Boise, ID (US)

(72) Inventors: Jiangli Zhu, San Jose, CA (US); Cheng Yuan Wu, Fremont, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/132,096

(22) Filed: Sep. 14, 2018

(65) Prior Publication Data

US 2020/0089429 A1 Mar. 19, 2020

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 7,952,928 | B2 | 5/2011 | Murin et al. |
| 2009/0113235 | A1* | 4/2009 | Selinger ............... G06F 11/1068 714/6.12 |
| 2009/0119453 | A1* | 5/2009 | Igashira ............... G06F 11/1076 711/114 |
| 2010/0100666 | A1 | 4/2010 | Min |
| 2012/0306902 | A1 | 12/2012 | MacWilliams et al. |
| 2016/0019139 | A1 | 1/2016 | Alam et al. |
| 2016/0371185 | A1 | 12/2016 | Brewer et al. |

FOREIGN PATENT DOCUMENTS

KR 20110037970 A 4/2011

OTHER PUBLICATIONS

International Search Report and Written Opinion dated Dec. 26, 2019, on application No. PCT/US2019/051167.

\* cited by examiner

*Primary Examiner* — Brian R Peugh
(74) *Attorney, Agent, or Firm* — Lowenstein Sandler LLP

(57) ABSTRACT

A host operation to be performed can be received. Sub-operations that are associated with the received host operation can be determined. A memory component of multiple memory components can be identified for each sub-operation. Furthermore, each sub-operation can be transmitted to a media sequencer component that is associated with a respective memory component of the memory components.

19 Claims, 6 Drawing Sheets

CONTROLLER WITH DISTRIBUTED SEQUENCER COMPONENTS

TECHNICAL FIELD

Embodiments of the disclosure relate generally to memory sub-systems, and more specifically, relate to a memory sub-system that includes a controller with distributed sequencer components.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
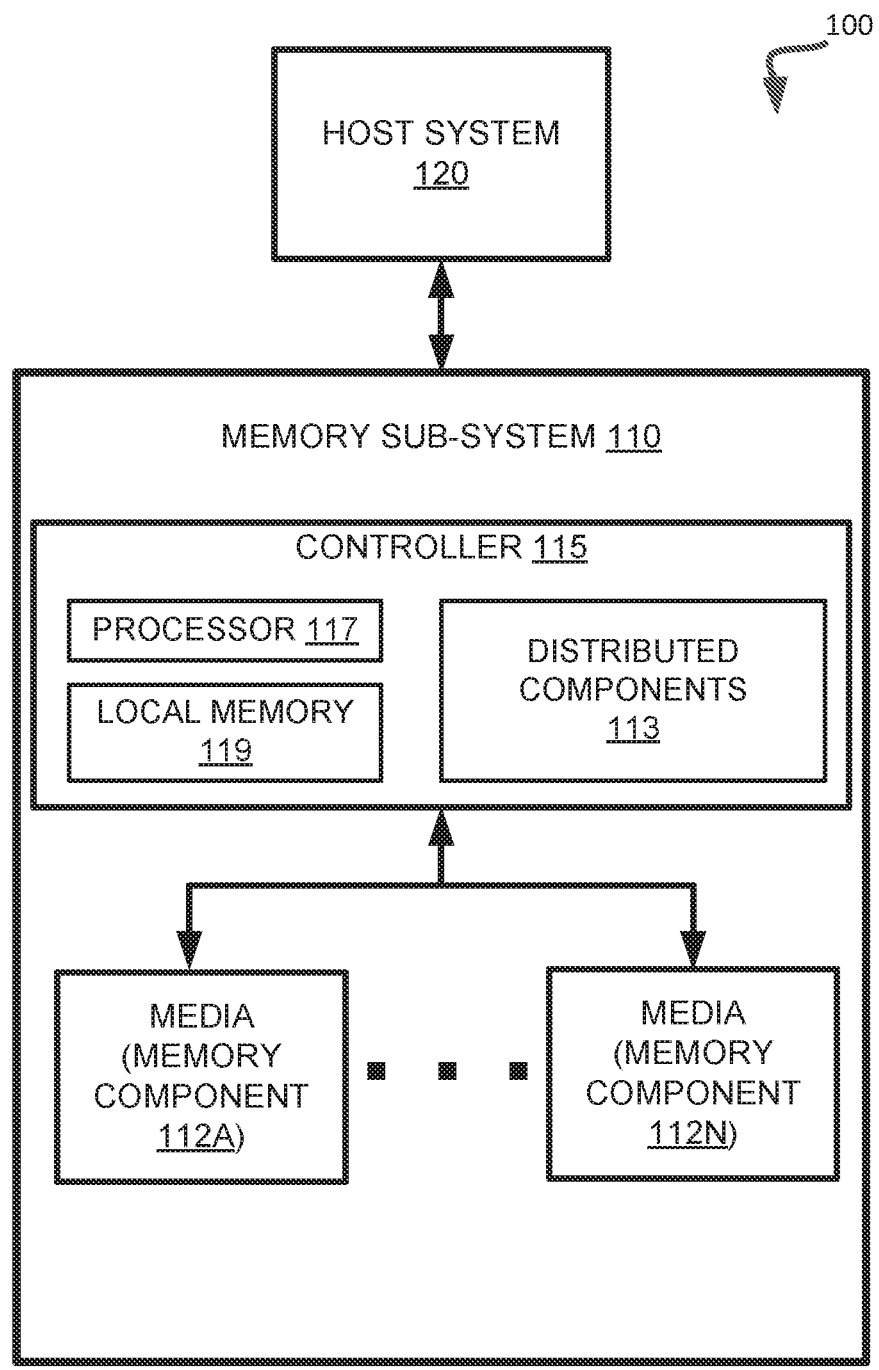
FIG. 1 illustrates an example computing environment that includes a memory sub-system in accordance with some embodiments of the present disclosure.

Aspects of the present disclosure are directed to a memory sub-system that includes a controller with distributed sequencer components. A memory sub-system is also hereinafter referred to as a "memory component." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include a controller that performs various operations at particular memory components of the memory sub-system. For example, the controller can perform a read operation, write operation, or an erase operation at one or more of the memory components. The controller can include multiple channels that are used to control different groups of memory components. Each channel can correspond to a portion of the controller and interface components that are used to communicate with and perform operations at a respective group of memory components. For example, a first channel can be used to perform operations at a first group of memory components and a second channel can be used to perform operations at a second group of memory components. As such, different channels of the controller can access different groups of memory components of the memory sub-system.

In a conventional memory sub-system, a controller can include a centralized scheduler and sequencer component that is used to facilitate the performance of operations at the different groups of memory components through the different channels. The centralized scheduler and sequencer component can receive an operation that is to be performed at the memory sub-system and can further receive data corresponding to the operation when the operation corresponds to a write operation. For example, the centralized scheduler and sequencer component can separate the operation into sub-operations that are to be performed at different groups of memory components through different channels. As such, the centralized scheduler and sequencer component can determine the sub-operations for various memory components at the channels of the controller when an operation is received by the memory sub-system.

The centralized scheduler and sequencer component of a conventional memory sub-system can determine the sub-operations for a single type of operation at a particular time. For example, a single operation to be performed by the memory sub-system can be received and corresponding sub-operations can be determined for each respective memory component that data is to be read or erased from or that data is to be written to. After the sub-operations have been determined, the centralized scheduler and sequencer component can determine page operations for particular memory components. The respective memory components can be organized as a rank where a particular memory component from the controller can be included in a single rank. The controller can use the centralized scheduler and sequencer component to operate on memory components in the same rank in a synchronous manner. For example, the controller can use the resulting page operations of the sub-operations from the centralized scheduler and sequencer component to perform a particular type of operation (e.g., a read operation, write operation, or erase operation) at memory components in a rank at a particular time and cannot perform another type of operation at other memory components in another rank at the same time.

Aspects of the present disclosure address the above and other deficiencies by utilizing a controller with distributed sequencer components. For example, the controller can include a command manager component to generate the sub-operations and distributed media sequencer components to determine page operations for different channels of the controller as opposed to a single centralized scheduler and sequencer component that generates the sub-operations and page operations for all of the channels of the controller. For example, the distributed media sequencer components can determine specific page operations that are to be performed at the respective memory components at each channel based on the sub-operations that are provided to the distributed media sequencer component. In some embodiments, the command manager can receive an operation to be performed at the memory sub-system and can derive multiple sub-operations for different memory components. As an example, the received operation can be to write 6 kilobytes (kb) of data to memory components and the sub-operations can correspond to three write operations of 2 kb of data at different memory components.

Each of the sub-operations can then be forwarded to a corresponding media sequencer component of a channel that includes the respective memory component corresponding to the sub-operation. The media sequencer component can then determine page operations based on the received sub-operation. The media component operations can specify page operations or locations of physical blocks of a memory component or can determine additional commands to be performed at the memory component to store, retrieve, or erase the data of the sub-operation.

Advantages of the present disclosure include, but are not limited to, an operation of the memory components in different channels in an asynchronous manner. For example, a first type of operation (e.g., a read operation) can be performed at the memory components of a first channel while a second type of operation (e.g., a write operation) can be performed at the memory components of a second channel at the same time. As a result, the performance of the memory sub-system can be improved as write operations can be performed at particular memory components while read operations are being performed at other memory components. Thus, the write operations are not halted or suspended until the read operations have completed, resulting in the performance of more operations by the memory sub-system in a particular period of time.

Additional advantages include increased throughput of the memory sub-system. For example, since each channel can include a separate media sequencer component, then data at a smaller granularity can be supported by different media sequencer components to store or retrieve data in parallel at the memory components of the memory sub-system. Additionally, since each media sequencer component receives a separate queue of sub-operations, each media sequencer component can optimize the execution of the sub-operations based on workload of the respective media sequencer component. Thus, each media sequencer component can achieve an improved execution of sub-operations, resulting in the improvement of performance of the memory sub-system.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes distributed components 113 that can be used to receive an operation and to generate sub-operations associated with the memory components 112A to 112N. In some embodiments, the controller 115 includes at least a portion of the distributed components 113. For example, the controller 115 can include a processor 117 (processing device) configured to execute instructions stored in local memory 119 for performing the operations described herein. In some embodiments, the functionality of some or all of the distributed components 113 are part of the host system 110, an application, or an operating system. For example, any combination of the command manager and the media sequencers can be performed by the host system 110, an application, or an operating system.

The distributed components 113 can receive an operation that is to be performed at the memory sub-system 110. The distributed components 113 can determine sub-operations and page operations for different channels that correspond to the received operation. For example, the distributed components 113 can include a media sequencer and an error correction component for each channel of the controller 115. Further details with regards to the operations of the distributed components 113 are described below.

Figure 2:
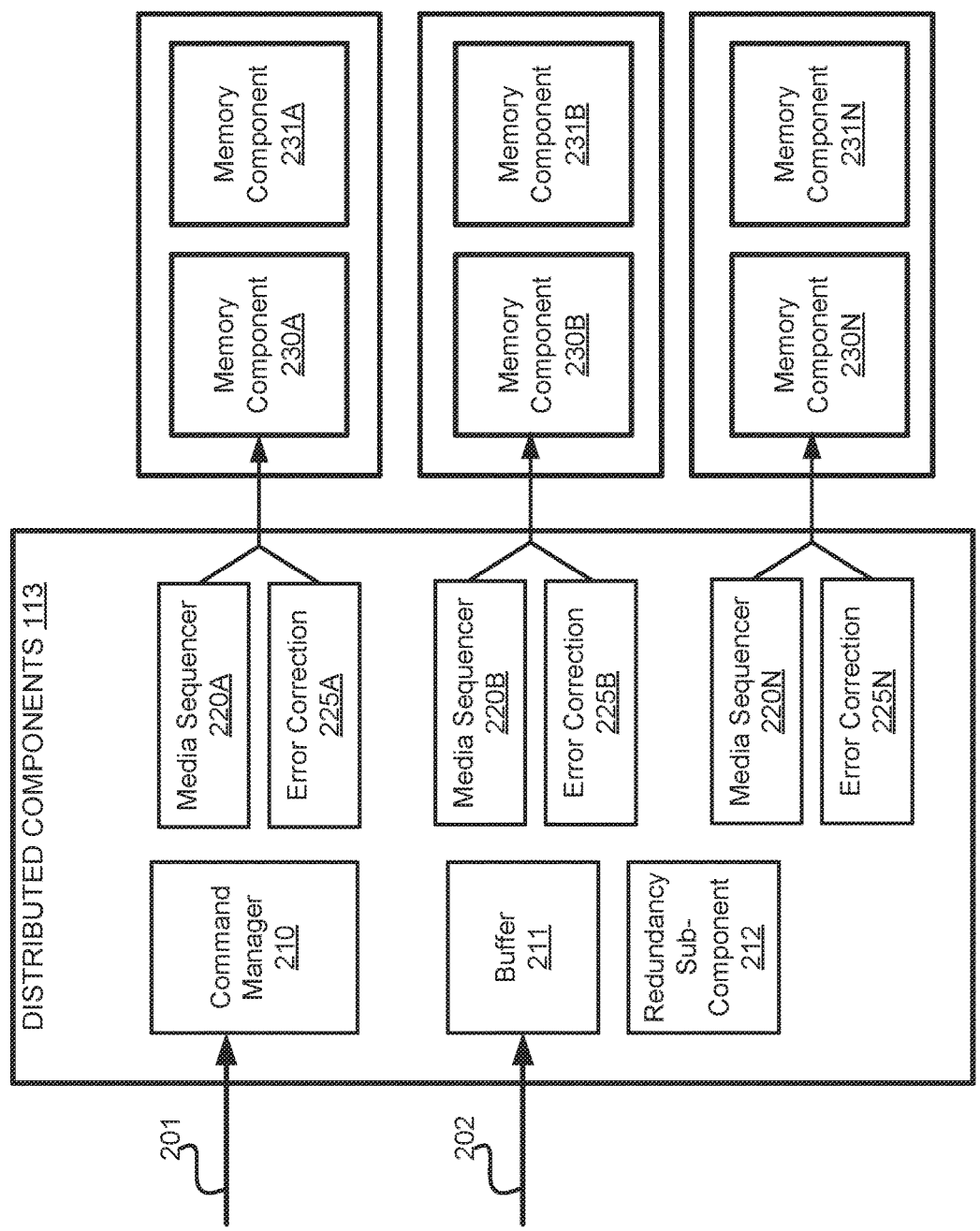
FIG. 2 illustrates an example controller with distributed components in accordance with some embodiments of the present disclosure.

FIG. 2 illustrates an example controller 200 with distributed components in accordance with some embodiments of the present disclosure. The controller 200 corresponds to the controller 115 of FIG. 1.

As shown in FIG. 2, the controller 200 can include the distributed components 113 and various memory components. The distributed components 113 can receive an indication of an operation 201 that is to be performed. In some embodiments, the distributed components 113 can receive data 202 when the operation 201 is a write operation. The data 202 can be stored at a buffer 211. In some embodiments, the buffer 211 can be a volatile memory of the controller 200. The command manager 210 can receive the operation 201 and can determine sub-operations that can be performed at various memory components to accomplish the operation 201. For example, the operation 201 can correspond to a write operation to program six kilobytes of data at the memory sub-system that includes the controller 200. The command manager 210 can then determine a first sub-operation to program two of the six kilobytes at a first memory component, a second sub-operation to program two of the kilobytes at a second memory component, and a third sub-operation to program the last two of the six kilobytes at a third memory component. The first, second, and third sub-operations can then be transmitted from the command manager 210 to a media sequencer in a channel that includes the corresponding first, second, or third memory component. Thus, a sub-operation can identify a particular memory component that an operation (e.g., a read operation or a write operation) is to be performed on.

Each channel of the controller 200 can include a media sequencer (or media sequencer component) and an error correction component that are used for the memory components of the channel. For example, as shown, a first channel can include the media sequencer 220A and error correction component 225A to be used with the memory components 230A and 231A. A second channel can include the media sequencer 220B and error correction component 225B to be used with the memory components 230B and 231B and a third channel can include the media sequencer 220C and error correction component 225C to be used with the memory components 230C and 231C. The media sequencer for a channel can receive a sub-operation that specifies a memory component that is used with or controlled by the channel. The media sequencer can determine page operations that can be used to perform the sub-operation. The page operations can specify physical locations of the specified memory component that are to be used to accomplish the sub-operation. In some embodiments, the page operation can specify a page of a corresponding memory component where a page can be a smallest unit of a memory component that can be addressed (e.g., read from or written to). As such, the command manager 210 can divide an operation 201 into sub-operations for memory components between multiple channels and the media sequencers of the channels can then further divide the sub-operations into page operations for each of the memory components. Thus, the operation 201 can specify data of a first size, the sub-operations can each specify data of a second size (e.g., a portion of the data of the first size) that is smaller than the first size, and the page operations can specify data of a third size that is smaller than the second size. Thus, the operation 201, sub-operations, and page operations can specify different amounts or granularity of data.

As shown, each channel can further include an error correction component (e.g., error correction component 225A, 225B, or 225C) that is used with data that is written to or read from the memory components of the respective channel. The error correction component can perform an error-correcting code (ECC) operation or any other type of error detection and correction operation for data stored at a memory component. In some embodiments, the error-correcting code operation can result in data being stored at a memory component being encoded by adding additional information (e.g., an ECC payload) to the data. The error correction component can apply any error detection and correction operation to data that is stored at a memory component and data that is retrieved from a memory component. As such, the data stored at memory components of different channels can be used in an error correction operation by different error correction components.

The distributed components 113 can further include a redundancy sub-component 212 that can perform a redundancy operation such as a redundant array of independent disks (RAID) operation that can be applied to different memory components at different channels. Further details with respect to the error control operation and the redundancy operation are described in conjunction with FIGS. 5A and 5B.

Figure 3:
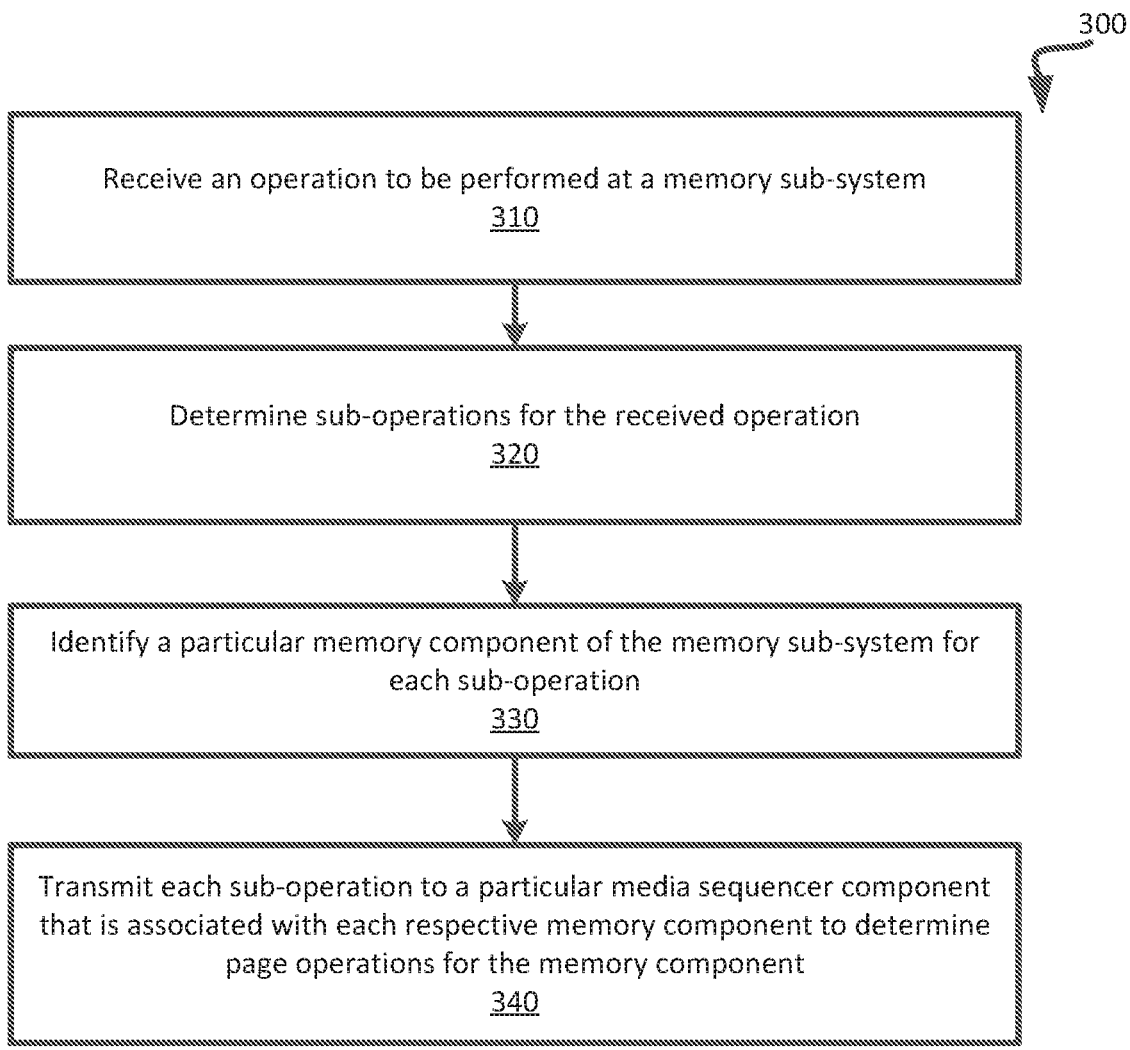
FIG. 3 is a flow diagram of an example method to transmit sub-commands to distributed media sequencer components of a controller in accordance with some embodiments.

FIG. 3 is a flow diagram of an example method 300 to transmit sub-commands to distributed sequencer components of a controller in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the distributed components 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, the processing logic receives an operation to be performed at a memory sub-system. The operation can correspond to a write operation, a read operation, or an erase operation associated with data at the memory sub-system. The operation that is received can be referred to as a host operation. In some embodiments, a host operation is a command or an instruction that is received from a host system that utilizes the memory sub-system. At block 320, the processing logic determines sub-operations for the received operation. The sub-operations can be based on memory components of the memory sub-system. The sub-operations can be determined for each memory component of the memory sub-system that is associated with the data of the operation. For example, a command manager can divide the operation between multiple memory components and each sub-operation can be determined for each memory component. For example, the operation can be to read 15 kilobytes of data and the command manager can determine that five kilobytes of the data are stored at a first memory component, another five kilobytes of the data are stored at a second memory component, and the last five kilobytes of the data are stored at a third memory component. Each of the memory components can be part of a different channel of a controller of the memory sub-system. In another example, the operation can be to write 15 kilobytes of data and the command manager can determine to divide the 15 kilobytes of data into 5 kilobyte groups that are each to be programmed or written to a different memory component of a different channel of the controller. At block 330, the processing logic identifies a particular memory component of the memory sub-system for each sub-operation. For example, each channel of the controller can include a separate media sequencer component. A first sub-operation for the first memory component can be identified to be provided to a first media sequencer component of a first channel, a second sub-operation for the second memory component can then be identified to be provided to a second media sequencer component of a second channel, and a third sub-operation for the third memory component can be identified to be provided to a third media sequencer component. At block 340, the processing logic transmits each sub-operation to a particular media sequencer component that is associated with each respective memory component to determine page operations for the memory component. For example, the media sequencer components of the different channels that received sub-operations can determine page operations for the received sub-operation. The page operation can specify particular physical locations of the memory component that data of the operation is to be retrieved from, written to, or erased from. The page operations can be for the memory components that are used by or controlled by the channel that includes a particular media sequencer component. Thus, different media sequencer components can be used to generate page operations for different groups of memory components in different channels and for the same received operation. The sub-operations can specify a portion of the data of the received operation and the page operations can specify portions of different sub-operations.

In some embodiments, each media sequencer component can apply a scheduling process to determine an order for determining page operations for a queue of received sub-operations. In some embodiments, the scheduling process can determine the order of sub-operations based on a media type or media status of the memory component that is coupled with the media sequencer component and the workload of the media sequencer component (e.g., the sub-operations in the queue). For example, a media sequencer component can schedule a particular type of sub-operation for determining the corresponding page operations earlier than another type of sub-operation based on one or more characteristics of the memory component coupled with the media sequencer component and/or other sub-operations that have not been processed by the media sequencer component.

Figure 4:
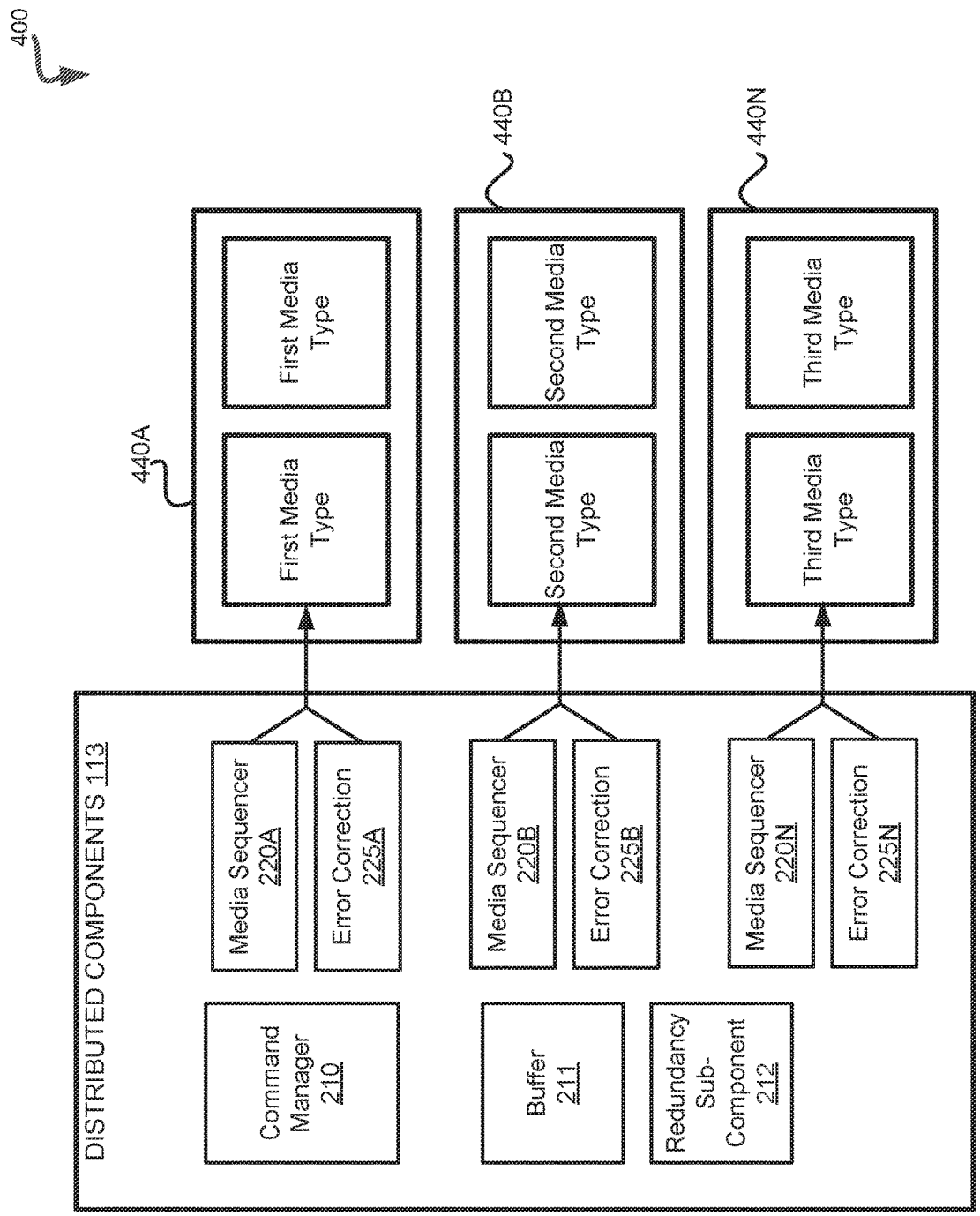
FIG. 4 illustrates an example controller with distributed components being used with different types of media in accordance with some embodiments of the present disclosure.

FIG. 4 illustrates an example controller with distributed components being used with different types of media in accordance with some embodiments of the present disclosure. As shown in FIG. 4, the controller 400 can include different channels 440A, 440B, and 440N that are used to perform operations at memory components with different types of media. The memory components in the channel 440A can be a cross-point non-volatile memory, the memory components in the channel 440B can be a NAND non-volatile memory, and the memory components in the channel 440N can be a DRAM memory. As such, different channels of the controller 400 and different media sequencer components and different error correction components can be used to perform operations at different types of memory components. Although three channels are shown, any number of channels and memory components can be used.

In operation, the command manager 210 can receive an operation and can transmit the sub-operations to the media sequencers 220A, 220B, and 220N. The command manager 210 can transmit the sub-operations to a particular media sequencer 220A, 220B, or 220N based on the media type of the memory component in the channel 440A, 440B, or 440N. For example, a certain media type can have different characteristics than another media type. For example, a first media type can have a better reliability or a shorter latency (e.g., less time to retrieve stored data) than another media type. The command manager 210 can transmit sub-operations to media sequencers based on the characteristic or type of media of the memory components that are in the channel that includes a respective media sequencer. In some embodiments, the sub-operations can be transmitted to the media sequencers based on the characteristic of the media type of the memory components satisfying a requirement of data to be stored at the memory components. For example, the operation received by the command manager 210 can be a write operation to write 10 kilobytes of data to the memory sub-system. The command manager 210 can determine that 2 kilobytes of the data to be written is metadata or system data associated with the other 8 kilobytes that is user data. The user data can be accessed or retrieved more often than the metadata or the system data. In response, the command manager can generate sub-operations to store the 8 kilobytes of user data to a media sequencer that is used with memory components with a media type that has a smaller latency than other media types while the other two kilobytes can be stored at another memory component with another media type that has a larger latency. Subsequently, the different media sequencers can generate page operations to store the respective metadata or system data and the user data at the respective memory components. In some embodiments, since the memory components can be different types of media, then the size and address of a page in a memory component can be different. As such, the page operations generated by a first media sequencer that is used with memory components of a first media type can specify different sizes of data to be stored at pages of the memory components than the page operations that are generated by a second media sequencer that is used with other memory components of a second media type that is different than the first media type.

Figure 5A:
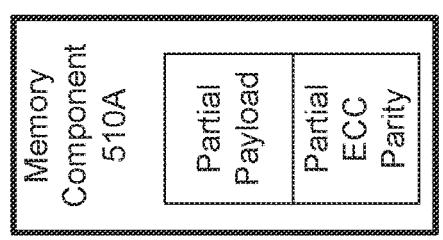
FIG. 5A illustrates an error correction scheme by a controller with distributed components in accordance with some embodiments.
Figure 5A:
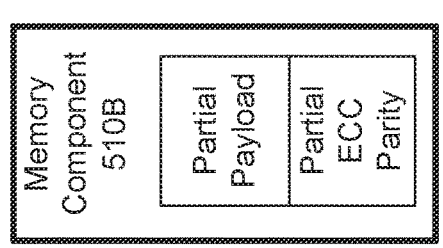
Figure 5A:
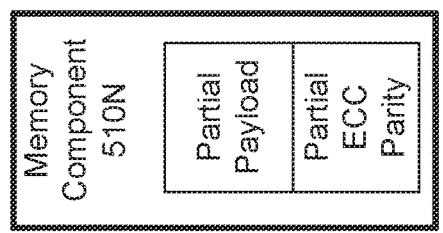

FIG. 5A illustrates an error correction scheme by a controller with distributed components in accordance with some embodiments. The error correction scheme can be implemented by an error correction component 225A, 225B, and/or 225N of FIG. 2.

As shown in FIG. 5A, each of the memory components 510A, 510B, and 510N can be associated with different channels as previously described. Each of the different channels can include a separate error correction component where each of the error correction components is used to store a code word (e.g., an ECC code word) across the memory components 510A, 510B, and 510N. For example, portions of an ECC payload (e.g., data) and corresponding ECC parity can be stored at each of the memory components at different channels. Thus, each error correction component in the different channels can be used to generate an ECC code word that is stored across the memory components 510A, 510B, and 510N.

Figure 5B:
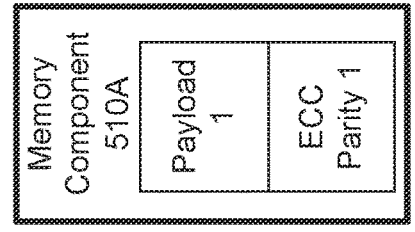
FIG. 5B illustrates another error correction scheme by a controller with distributed components in accordance with some embodiments.
Figure 5B:
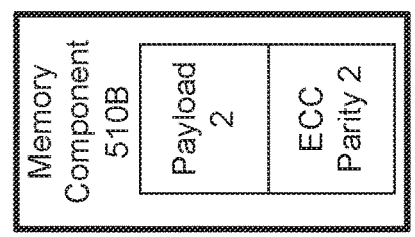
Figure 5B:
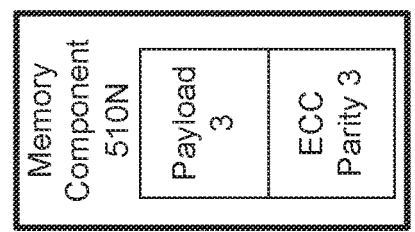

FIG. 5B illustrates another error correction scheme by a controller with distributed components in accordance with some embodiments. The error correction scheme can be implemented by an error correction component 225A, 225B, and/or 225N of FIG. 2.

As shown in FIG. 5B, the error correction components of different channels can each store a separate code word (e.g., ECC code word) at each respective memory component 510A, 510B, and 510C. For example, a first error correction component of a first channel can be used to generate and store a code word (e.g., the payload 1 and the ECC parity 1) at the memory component 510A and a separate second error correction component of a second channel can be used to generate and store another code word (e.g., the payload 2 and the ECC parity 2) at the memory component 510B. Furthermore, a third error correction component of a third channel can be used to generate and store a third code word at the memory component 510N. Thus, each error correction component of a channel can be used to generate and store separate code words at separate memory components.

In some embodiments, a redundancy sub-component (e.g., the redundancy sub-component 212) can further be used to generate parity data for different memory components. For example, different parity data can be used based on data stored at a respective memory component.

Figure 6:
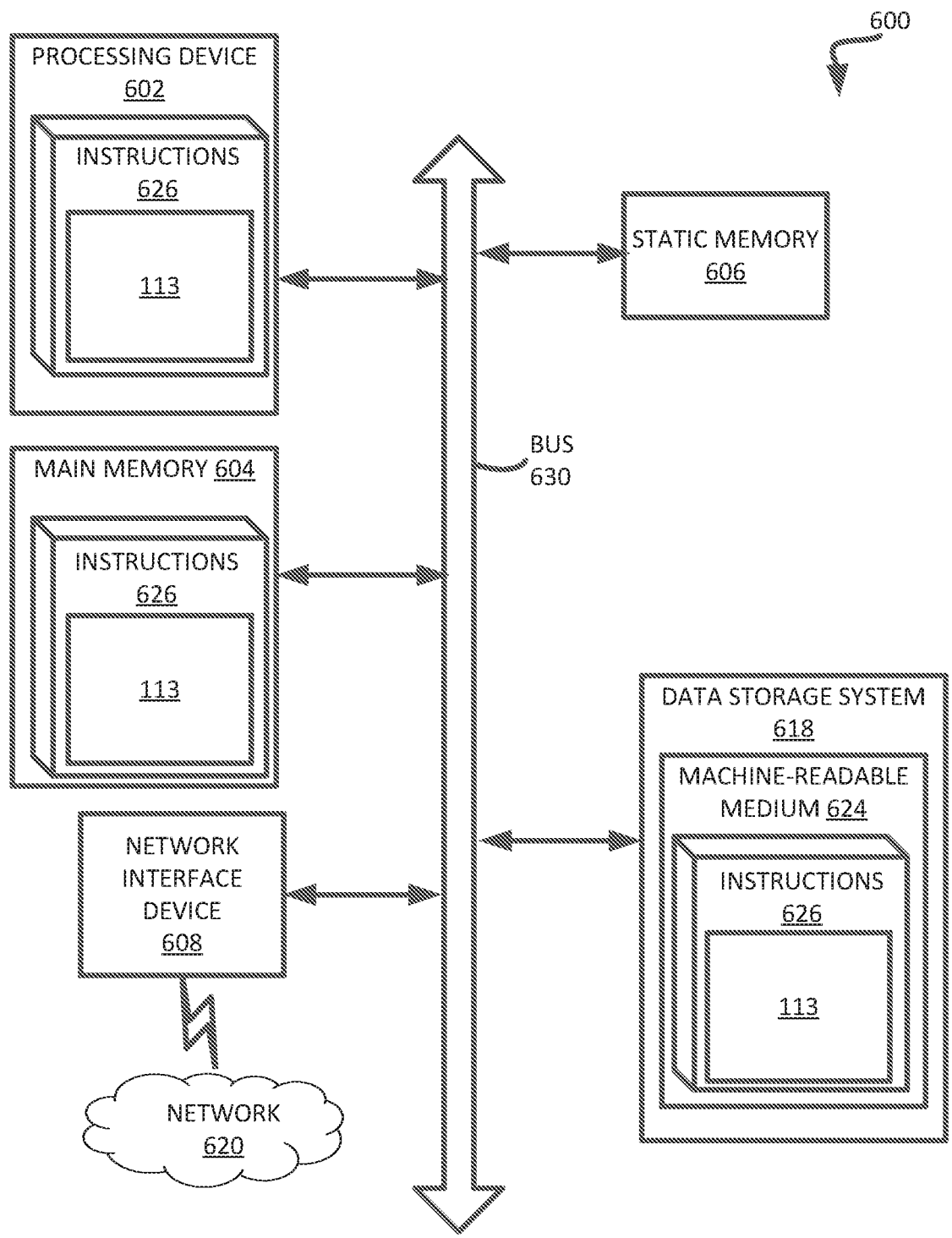
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some implementations, the computer system 600 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to the command manager 210 or media sequencer 220A-N of the distributed components 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions or software 626 embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one implementation, the instructions 626 include instructions to implement functionality corresponding to any or all of the components of the distributed components (e.g., the distributed components 113 of FIG. 1). While the machine-readable storage medium 624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
   a plurality of memory components; and
   a memory sub-system controller operatively coupled with the plurality of memory components, the memory sub-system controller comprising:
   a first media sequencer component,
   a second media sequencer component, and
   a command manager component, the command manager component operatively coupled with the first media sequencer component and the second media sequencer component, to:
   receive a host operation to be performed at the system;
   determine a plurality of sub-operations associated with the host operation, each sub-operation corresponding to a different one of the plurality of memory components;
   identify a corresponding memory component of the plurality of memory components for each sub-operation of the plurality of sub-operations, wherein each corresponding memory component is associated with a different channel of a plurality of channels of the memory sub-system controller, and wherein each of the first media sequencer component and the second media sequencer component is associated with a different channel of the plurality of channels;
    transmit a first sub-operation of the plurality of sub-operations to the first media sequencer component that is associated with a first memory component of the plurality of memory components, wherein the first media sequencer component is to determine first page operations for the first memory component based on the first sub-operation; and
    transmit a second sub-operation of the plurality of sub-operations to the second media sequencer component that is associated with a second memory component of the plurality of memory component, wherein the second media sequencer component is to determine second page operations for the second memory component based on the second sub-operation.

2. The system of claim 1, wherein each of the first page operations and the second page operations corresponds to a portion of data specified by the host operation.

3. The system of claim 1, further comprising:
a plurality of media sequencer components comprising at least the first media sequence component and the second media sequence component, wherein each media sequencer component of the plurality of media sequencer components is associated with a different channel of the plurality of channels.

4. The system of claim 3, further comprising:
a plurality of error correction components, wherein each error correction component is included in a different channel of the plurality of channels.

5. The system of claim 1, wherein the command manager component is to further identify the respective memory component of the plurality of memory components for each sub-operation based on a type of the respective memory component, wherein the plurality of memory components correspond to a plurality of types of memory components, and wherein a respective media sequencer component that is associated with the respective memory component of the plurality of memory components schedules the sub-operation based on the type of the respective memory component.

6. A system comprising:
a plurality of memory components;
a command manager component, operatively coupled with the plurality of memory components, to:
    receive a host operation to be performed at the system;
    determine a plurality of sub-operations associated with the host operation;
    identify a memory component of the plurality of memory components for each sub-operation of the plurality of sub-operations; and
    transmit each sub-operation of the plurality of sub-operations to a media sequencer component that is associated with a respective memory component of the plurality of memory components;
a plurality of media sequencer components, wherein each media sequencer component of the plurality of media sequencer components is associated with a different channel of a controller of the system; and
a plurality of error correction components, wherein each error correction component is included in a different channel of the controller, wherein each error correction component of the plurality of error correction components generates a particular code word at each memory component of the plurality of memory components that is controlled by a particular channel.

7. The system of claim 6, wherein each of the page operations corresponds to a portion of data specified by the host operation.

8. The system of claim 6, wherein the command manager component is to further identify the respective memory component of the plurality of memory components for each sub-operation based on a type of the respective memory component, wherein the plurality of memory components correspond to a plurality of types of memory components, and wherein the media sequencer component that is associated with the respective memory component of the plurality of memory components schedules the sub-operation based on the type of the respective memory component.

9. A system comprising:
a plurality of memory components; and
a memory sub-system controller operatively coupled with the plurality of memory components, the memory sub-system controller comprising:
    a command manager component to receive a host operation associated with data at the plurality of memory components and to determine a plurality of sub-operations of the received host operation, each sub-operation corresponding to a different one of the plurality of memory components, and
    a plurality of media sequencer components to receive the plurality of sub-operations, wherein each media sequencer component of the plurality of media sequencer components generates one or more page operations for a corresponding memory component of the plurality of memory components based on a received sub-operation of the plurality of sub-operations, wherein each corresponding memory component is associated with a different channel of a plurality of channels of the memory sub-system controller, and wherein each of the plurality of media sequencer components is associated with a different channel of the plurality of channels.

10. The system of claim 9, wherein each of the one or more page operations corresponds to a portion of the data.

11. The system of claim 9, further comprising:
a plurality of error correction components, wherein each error correction component is associated with a different media sequencer component.

12. The system of claim 11, wherein each error correction component of the plurality of error correction components generates a particular code word at each memory component of the plurality of memory components that is controlled by a particular channel of the plurality of channels.

13. The system of claim 9, wherein the plurality of sub-operations are based on different types of memory components of the plurality of memory components.

14. The system of claim 9, wherein the data is a first size, wherein second data for a particular sub-operation is at a second size that is smaller than the first size, and wherein third data for a particular page operation is at a third size that is smaller than the second size.

15. A method comprising:
receiving a host operation to be performed;
determining a plurality of sub-operations associated with the host operation;
identifying a memory component of a plurality of memory components for each sub-operation of the plurality of sub-operations;
transmitting, by a processing device, each sub-operation of the plurality of sub-operations to a corresponding media sequencer component that is associated with a respective memory component of the plurality of memory components, wherein each corresponding media sequencer component is one of a plurality of media sequencer components of a memory sub-system controller operatively coupled with the plurality of memory components, wherein each corresponding memory component is associated with a different channel of a plurality of channels of the memory sub-system controller, and wherein each of the plurality of media sequencer components is associated with a different channel of the plurality of channels; and determining, by the corresponding media sequencer component, page operations for the respective particular memory component that is associated with the corresponding media sequencer component.

16. The method of claim 15, wherein each of the page operations corresponds to a portion of data specified by the host operation.

17. The method of claim 15, wherein each of the page operations is associated with a page that corresponds to a smallest unit of a particular memory component that is to be addressed.

18. The method of claim 15, wherein the identifying of the memory component is based on a type of memory of the memory component.

19. The method of claim 15, wherein the corresponding media sequencer component is associated with an error correction operation.

* * * * *